March 30, 1965 T. R. BATIN ET AL 3,176,079
DIGIT ABSORBING TRUNK CIRCUIT
Filed March 23, 1961 3 Sheets-Sheet 1

INVENTORS.
THOMAS R. BATIN
WILBERT C. BROWN
BY WILLIAM W. PHARIS
George W. Killian
AGENT March 30, 1965 T. R. BATIN ET AL 3,176,079

DIGIT ABSORBING TRUNK CIRCUIT

Filed March 23, 1961 3 Sheets-Sheet 3

United States Patent Office 3,176,079
Patented Mar. 30, 1965

3,176,079
DIGIT ABSORBING TRUNK CIRCUIT
Thomas R. Batin, Rochester, Wilbert C. Brown, Penfield, and William W. Pharis, Rochester, N.Y., assignors to General Dynamics Corporation, Rochester, N.Y., a corporation of Delaware
Filed Mar. 23, 1961, Ser. No. 97,812
7 Claims. (Cl. 179—18)

Figure 1:
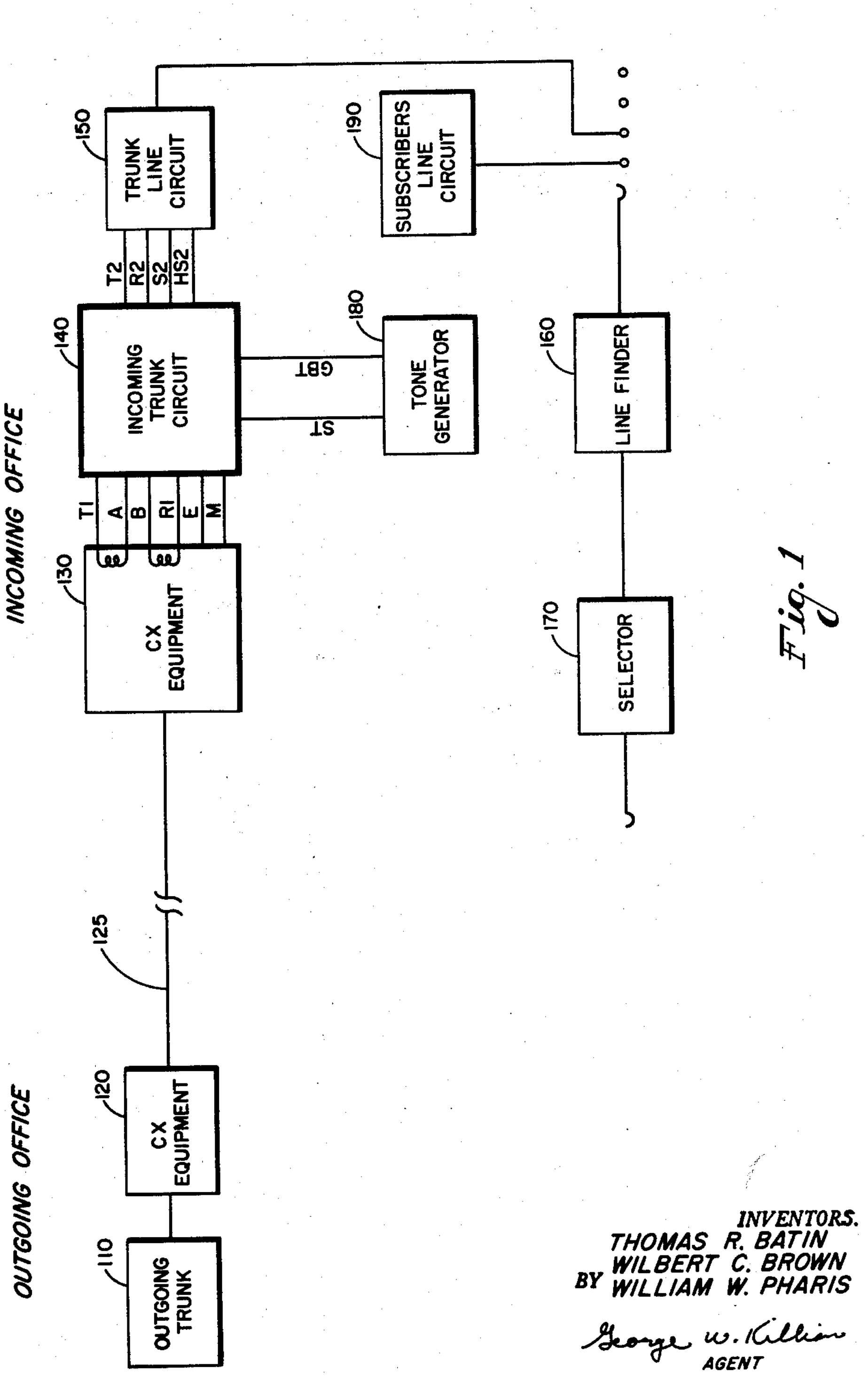

This invention relates in general to automatic telephone systems and, more particularly, to automatic telephone systems which incorporate interoffice trunking.

Although the invention herein disclosed is suitable for more general application, the disclosed embodiment is particularly adapted for use in automatic telephone systems which incorporate means for completing interoffice communication connections. An example of a common and widely used system incorporating such interoffice trunking is the ubiquitous P.B.X telephone system used by the personnel in many factories, corporations and agencies. In typical P.B.X systems, a user is instructed that to gain access to the city telephone system he should dial a code number, usually "9," and wait for a dial tone before proceeding to dial the digital designation of the desired sation. The casual telephone user is thoroughly familiar with such operation and is vaguely cognizant of the fact that certain telephone switching equipment requires time to carry out its function after he has dialed the "9" and that dialing additional digits would only result in a lost or misdirected call if they are dialed prior to the completion of the required function, which is indicated by the receipt of dial tone from the central office. More specifically, in systems wherein the central office comprises step-by-step type equipment, incoming trunk circuits from P.B.X's are terminated with conventional line circuits and, therefore, time must be allowed for allotter and line finder operations before a central office selector is made available to the calling P.B.X subscriber. The need to wait for a second dial tone could be eliminated by terminating incoming P.B.X trunks with an incoming selector in the central office. However, this would add materially to the cost of the system.

When calls are initiated between two telephone exchanges, a similar action must take place. That is, the call must be extended from one telephone exchange to another by directive pulses. Since such extension may be made after various digits, depending upon the particular trunking arrangements, and since the calling subscriber is not conscious of such trunking operation and proceeds rapidly with his dialing, it is necessary to have interoffice trunk circuits be terminated with an incoming selector rather than with line circuits. As previously mentioned, use of incoming selectors to terminate incoming trunks is more expensive than the use of line circuits.

The present invention is directed to a means for facilitating interoffice communication connections.

It is the general object of this invention to provide a new and improved automatic telephone system.

It is a more particular object of this invention to provide an improved means for completing connections between telepohne exchanges.

It is another object of this invention to provide an incoming trunk circuit which can facilitate the completion of incoming calls without requiring a directly connected incoming selector.

In accordance with the present invention, an incoming trunk is terminated with a line circuit, or similar circuit, rather than with an incoming selector. In order to allow time for the necessary linefinder, or the equivalent, operation, the incoming trunk is arranged to absorb predetermined digits and to forward subsequent digits to the selector associated with the trunk after the linefinder operation, only when the said linefinder operation is completed prior to the receipt of a predetermined digit at the incoming trunk. In the event that the linefinder operation is not completed prior to the receipt of the predetermined digit at the incoming trunk, a tone indicative of this failure is returned over a transmission connection to the calling party and further dialing by the calling party is made ineffective. In addition, the trunk circuit can apply a marking potential on a lead to the selector associated therewith to indicate that the selector is being seized from a trunk circuit and that appropriate and predetermined action should follow the receipt of each digit. For example, the selector should not return dial tone.

The described operation greatly reduces the expense of interoffice trunking facilities by terminating incoming trunks with line circuits rather than with an incoming selector and by permitting the selectors which are subsequently associated with the trunk circuits to be one of the regular first selectors when this proves expedient.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise three figures on three sheets. Sheets two and three should be arranged in successive order from left to right to show the details of the invention.

FIG. 1 illustrates a typical interoffice trunking arrangement including a trunk circuit incorporating the present invention.

Figure 2:
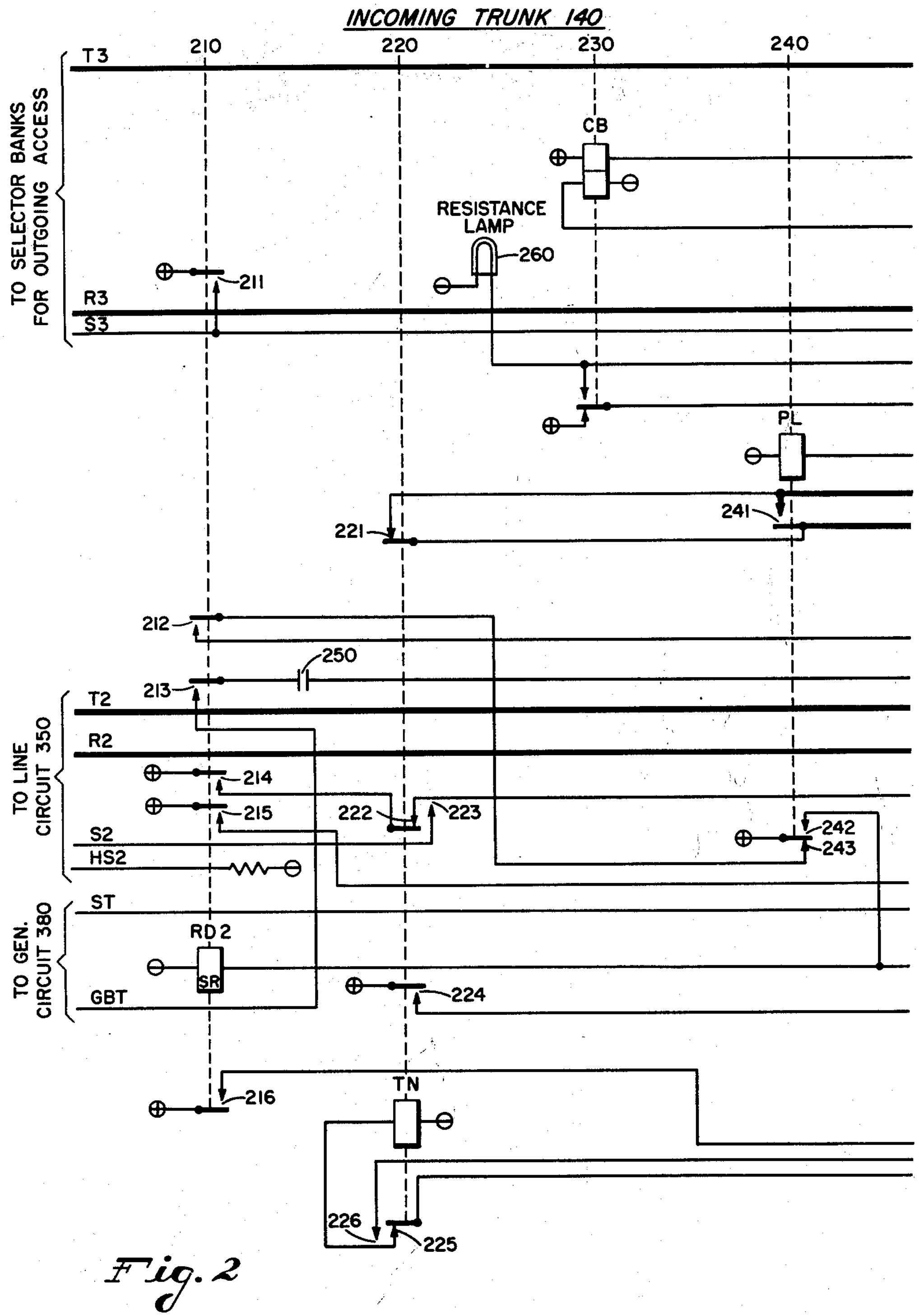
Figure 3:
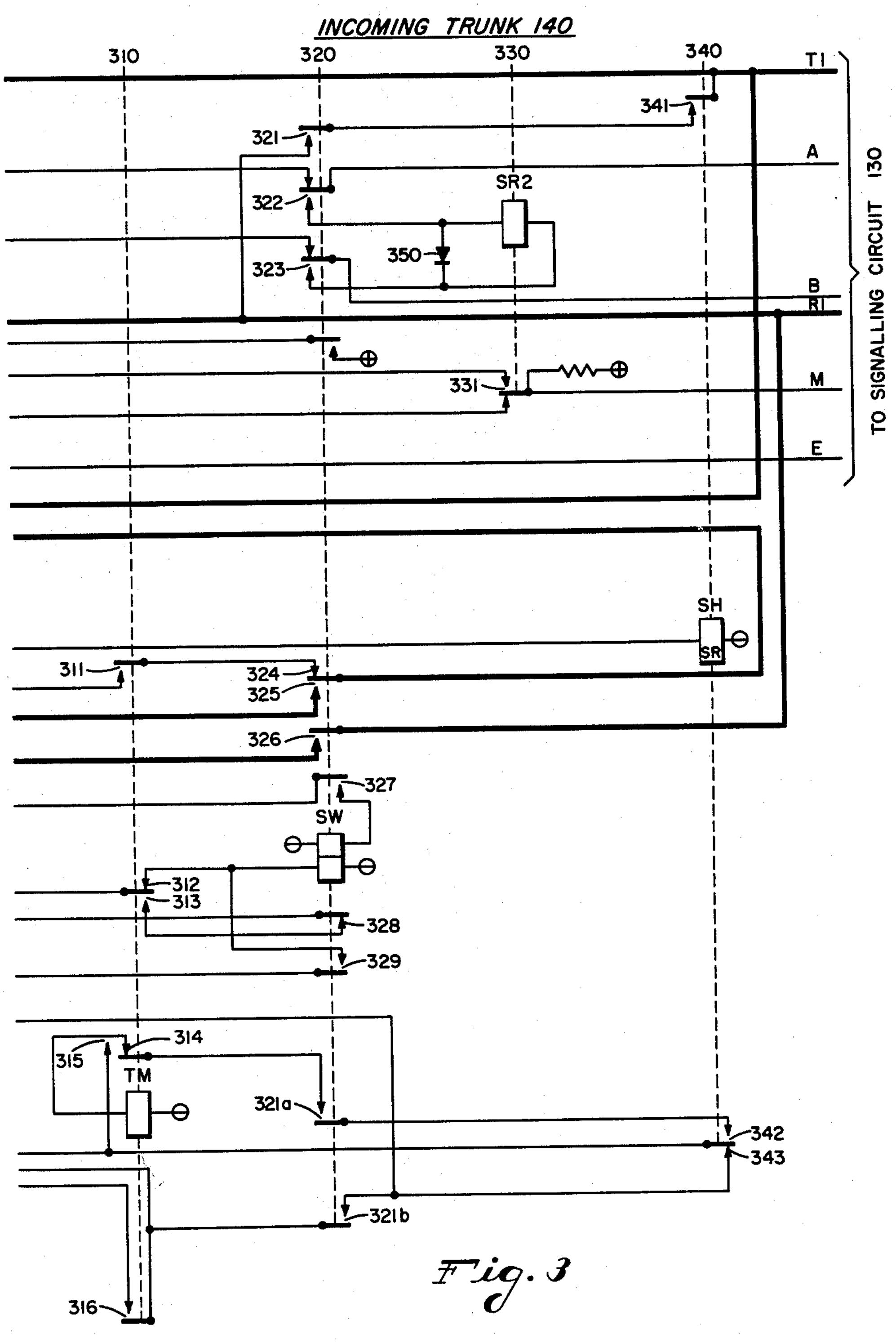

FIGS. 2 and 3, taken together, show the necessary details of an interoffice trunk circuit incorporating the invention.

It is to be understood that FIGS. 2 and 3 show only the details of the circuit which are necessary for a complete understanding of the invention. For example, in actual practice, an interoffice trunk circuit would normally be a two-way trunk circuit. However, in the illustrated embodiment, most of the details of the trunk circuit for outgoing operation have been omitted as such details are well known in the art and would only tend to obscure the invention disclosed herein. For improved clarity of the drawings, all terminals which are intended to be connected to the positive terminal of the power supply are designated (+) and will hereinafter be referred to as "ground." In a similar manner, all terminals which are intended to be connected to the negative terminal of the power supply are designated (—) and will hereinafter be referred to as "battery"; all in the manner that is customary in the telephone art.

For convenience, the illustrated trunk circuit is shown as one which may be connected to a composite (CX) signaling set. This means that the terminals designated T1 and A are electrically connected together through a winding of a repeat coil. In a similar manner, the terminals designated R1 and B are electrically connected together through another winding of the same repeat coil. The E and M leads function in a manner which is well known in the telephone art. Briefly, the M lead may be considered to be the lead which is used to send signals to the remote office, while the E lead may be considered to be the lead on which signals are received from the remote office. For a more complete discussion of CX operation and E and M signaling, reference may be had to "Notes on Distance Dialing," 1956 edition, published by A.T.&T., Section IV, pages 18 and 19, or any standard text on telephone switching and signaling techniques.

Of course, the invention disclosed herein would work equally well with other signaling systems, such as loop, differential duplex, etc.

It is believed that the operation of the invention can best be understood by tracing the extension of a call through a system incorporating a trunk circuit including the invention. For this purpose, reference should be had to FIG. 1, which illustrates a typical interoffice trunking plan incorporating the present invention. A subscriber in the outgoing office who desires to complete a connection to another subscriber located in, or accessed through, the incoming office may originate a call in the standard manner. By directive signals, the originating subscriber can affect a seizure of the outgoing trunk 110 which causes CX equipment 120 to transmit a seizure signal over line 125, connecting the two offices, to CX equipment 130. In response to the signal received by the CX equipment 130 in the incoming office, a signal is transmitted on the E lead to incoming trunk circuit 140. All of the preceding circuit operation is well known in the telephone art. It is also known in the art to have a line circuit 150 permanently associated with an incoming trunk and to provide a second dial tone to the originating subscriber when the linefinder and selector 160 and 170, respectively, are properly associated with line circuit 150. However, this last operation is inconvenient, awkward and confusing as subscribers frequently are not aware of the need to wait for the second dial tone and proceed with their dialing, thereby obtaining an incorrect connection or no connection. It is also known in the art to connect an incoming selector directly to the incoming trunk, thereby eliminating the need to wait for a linefinder type operation and eliminating the possibility of a misdirected call.

The present invention employs a new and improved incoming trunk circuit 140 which absorbs at least one digit before permitting any pulses to be transmitted to associated circuits. Therefore, extra time is provided for permitting a linefinder type operation, thereby permitting satisfactory and economical operation with a line circuit 150 connected to incoming trunk circuit 140. When the trunk circuit 140 is seized from the outgoing office, a signal is passed to line circuit 150 which causes it to initiate a linefinder action, thereby causing linefinder 160 and selector 170 to be associated with trunk 140. The first digit which is dialed after the seizure of trunk 140 is absorbed therein and provision is made for transmitting subsequent digits to the selector 170 only if the linefinder 160 and selector 170 are timely associated with trunk 140 prior to the commencement of the pulsing of the digit to be transmitted. If the linefinder 160 and selector 170 are not timely associated with trunk 140, the trunk circuit opens the forward circuit to prevent subsequent association between the trunk circuit and the selector and also starts tone generator circuit 180, which returns an indicating tone back through trunk 140 to the originating subscriber to indicate that the connection cannot be completed without another attempt.

The line circuit 150 associated with trunk 140 may be included in the same group as a line circuit, such as 190, serving a local subscriber. In this case, trunk circuit 140 provides marking over the HS2 lead to indicate that selector 170 should function in a predetermined manner that differs from the predetermined manner in which it functions when used by a local subscriber. Accordingly, trunk circuit 140 provides a means for completing a connection with a minimum probability of the attempt resulting in a lost call, consistent with economical operation, and without requiring the use of an individual incoming selector per trunk.

For a more complete understanding of the invention, FIGS. 2 and 3 should be examined together with the following description.

*Seizure.*—The circuit shown in FIGS. 2 and 3 may be seized by a predetermined circuit operation in the remote office which causes a ground to be placed on the E lead of FIG. 3 which is effective to operate relay 240. In response to the operation of relay 240, contacts 241 and 242 close and contacts 243 open. Contacts 242 are effective to close a circuit to relay 210, which operates, and which, it should be noted, is designated SR to indicate that it is a slow release relay and that, therefore, it will not release even when open-circuited for brief intervals, as during dialing.

In response to the operation of relay 210, contacts 211–216, inclusive, close. Contacts 211 are effective to place a ground on the lead designated S3 which is effective to prevent seizure of the trunk circuit from the outgoing access terminals T3, R3 and S3. As mentioned, the circuit details for completing an outgoing call have been omitted. However, it may be observed that an outgoing call could be originated by closing a loop across terminals T3 and R3 which would be effective to operate relay 230. Contacts 215 close a circuit through normally closed contacts 312 on relay 310 to operate relay 320 on its lower winding. The remaining contacts on relay 210 do not complete any circuits at this time.

The operation of relay 220 is effective to close a loop across leads T2 and R2, which is effective to seize the line circuit connected thereto and thereby institute a linefinder type operation in the manner that is well known in the telephone art. This loop circuit may be traced from lead T2, through operated contacts 325 of relay 320, closed contacts 241 and 221 in parallel, to lead T1 and thence through the mentioned winding of a repeat coil to the lead designated A, through contacts 322, diode 350 and relay coil 330 in parallel, contacts 323, to the B lead and through the other mentioned repeat coil winding to lead R1, and operated contacts 326 to lead R2. The T2 lead is normally connected to ground through the line circuit, while the R2 lead is normally connected to battery through the line circuit. Therefore, the diode 350 shunts the winding of relay 330 and, consequently, there is insufficient current through the winding of relay 330 to operate it. Relay 320, in operating, closes contacts 327 which are effective to provide a lockup circuit for relay 320 on its upper winding as long as contacts 222 and 214 remain closed. In addition, contacts 329 provide an alternate lockup circuit for the lower winding of relay 320 as long as contacts 242 of relay 240 remain closed.

*Dialing.*—In response to the receipt of dialing impulses originated by the calling subscriber, the ground on the E lead will be intermittently interrupted a number of times corresponding to the digit dialed. The PL relay 240 will repeat the pulses and, as relay 240 pulses, contacts 241 and 242 will momentarily open and reclose. Although contacts 241 are included in the loop circuit that seized the associated line circuit, it will be observed that the loop circuit is not pulsed by contacts 241 as these contacts are shunted by normally closed contacts 221. Therefore, the first train of pulses that are forwarded from the originating office to the office wherein the illustrated trunk is located, after the illustrated trunk is seized, will not be forwarded to the succeeding circuits.

Obviously, the digit which is not forwarded to the succeeding equipment can play no part in determining the final connection to be made. This, however, is not a severe limitation inasmuch as it is frequently necessary to absorb, or discard, one or more digits during the setting up of a connection to a called subscriber whose number designation constitutes the customary seven digits. Normally, such number absorption is accomplished in selector circuits. Many selector circuits which accomplish number absorption have been developed. Typical examples of such selector circuits may be seen in the following patents which are all assigned to the same assignee as the present invention: 2,658,949; 2,721,902, 2,854,515; 2,854,518; 2,868,885; 2,892,893, and 2,895,011 to William W. Pharis, as well as Patent 2,847,510 to Ernest H. Gatzert.

Although the present invention is limited to use in systems wherein at least one digit of the called subscriber's directory number is a dummy digit, this is not a severe limitation as most local calls and calls between telephone offices in a given exchange area require absorption, or cancellation, of one or more digits of the called number. Naturally, the associated trunking plan must provide for having a digit to be cancelled be one immediately succeeding the seizure of the illustrated trunk. With the wide variety of selectors available for use, the required trunking arrangement may be readily obtained.

When desired, the line circuit seized by the illustrated trunk may be included in the same group with the line circuits serving local subscribers. When used in this manner, marking, such as the resistance battery marking illustrated on the HS2 lead, may be forwarded to the selector associated with the linefinder that found the line circuit in order to indicate to the selector that the selector should function in a predetermined manner that differs from its normal operation when seized by a local subscriber. For example, the selector should not return dial tone and will probably be required to absorb no digits, or at least a different series of digits, and/or may be required to restrict predetermined levels, etc.

In response to the first release of relay 240 when the pulsing of the first digit after seizure began, relay 340 is operated from ground at contacts 243, through operated contacts 212 to relay 340. Relay 340 remains operated during the pulsing of the entire digit due to its slow release characteristic which is indicated by the designation SR in the rectangle representing the operating coil of relay 340. The operation of relay 340 closes contacts 341 to connect leads T1 and R1 together through contacts 321. In addition, the closing of contacts 342 completes a circuit from ground at contacts 216, through contacts 342, **321*a* and 314 to relay 310, which operates. Relay 310, in operating, closes contacts 315 before contacts 314 open, thereby completing a lockup circuit to ground at contacts 216 of relay 210**.

At the conclusion of the pulsing of relay 240 at the end of the digit, relay 240 will remain operated and relay 340 will be open circuited, thereby causing it to release at the end of its slow release time. In response to the release of relay 340, a circuit is completed from ground at contacts 216, through contacts 343, **321*b*, 316 and 225 to operate relay 220. Relay 220 locks from ground at contacts 224, through contacts 321*b* and make-before-break contacts 226 to relay 220**.

Operation of relay 220 opens contacts 221, which had served to shunt pulsing contacts 241 and, therefore, any subsequent pulsing that is repeated by contacts 241 may be forwarded to associated switching circuits. Contacts 223 of relay 220 close before contacts 222 open. Thus, the upper winding of relay 320 is maintained energized as contacts 223 close and contacts 222 open if a ground is present on lead S2. A ground will be present on lead S2 if the associated line circuit has been found by the linefinder and a selector is properly associated with the line circuit and ready to receive pulses. However, if the selector is not yet associated with the line circuit, relay 320 is still maintained operated from ground at contacts 242, through contacts 329 to the lower winding of relay 220. Thus, relay 320 will be held operated after the first digit has been dialed if a selector is properly associated with the trunk circuit or until the first pulse of the second digit is received. Accordingly, the circuit operation following each alternative must be examined.

*Trunk circuit operation when selector is not timely associated with the trunk circuit.*—Ordinarily, the only reason that a selector would not be timely associated with the trunk circuit within the time allowed by the dialing of an absorbed digit would be because of inoperative equipment or insufficient equipment to handle the traffic. If the selector should fail to be associated with the trunk before the start of the dialing of the second digit, relay 320 will release at the start of the first pulse as contacts 242, which repeat the received pulses, will open the circuit to relay 320.

Release of relay 320 will open contacts 325 and 326, thereby opening the loop to the line circuit. The loop is opened to prevent subsequent association of a selector with the trunk as such association would only result in a lost or misdirected call and the futile use of common equipment. In addition, release of relay 320 will open contacts **321*b*, thereby releasing relay 220**.

When relay 220 releases, ground at contacts 215 is forwarded through contacts 313 and 328 to the start lead, designated ST, to the indicating tone circuit to cause said tone circuit to generate a tone signal which is returned on the lead designated GBT. The tone signal on lead GBT is conducted through contacts 213, capacitor 250, contacts 311, 324, 241 and 221 in parallel, to the T1 lead and thence back over the transmission circuit to the calling subscriber as an indication that the connection cannot be completed.

When the calling subscriber disconnects the pulsing, relay 240 releases to release relay 210. In response to the release of relay 210, all other relays release and the circuit is returned to its standby condition.

*Trunk circuit operation when selector is timely associated with the trunk circuit.*—After dialing the first digit, the following trunk circuit relays are operated: 240, 210, 320, 310 and 220. With the timely association of a selector to the trunk circuit during the time allowed, a ground is returned by the associated selector on the S2 lead to hold relay 320 operated on its upper winding.

As in the case when the first digit was dialed, relay 340 will reoperate on the first pulse of the second digit. The pulses which are received on the E lead are repeated by relay 240 and will be repeated to the forward circuits by contacts 241. At the conclusion of the pulses representing the digit, relay 340 releases. Each succeeding digit is repeated in the same manner.

When the calling party answers, any convenient form of answer supervision may be used. The illustrated embodiment illustrates the use of reverse battery which causes relay 330 to operate since the current through the loop is then in the wrong direction to permit diode 350 to be effective to shunt relay 330. In response to the operation of relay 330, contacts 331 close to apply battery through resistance lamp 260 to the M lead, thereby returning answer supervision to the calling office.

Release of the connection by the calling party causes relay 240 to release and, in turn, relay 210 releases which directly, or indirectly, causes all other relays to release, thereby restoring the trunk circuit to its standby condition.

While there has been shown and described what is considered at present to be the preferred embodiment of the invention, modifications will readily occur to those skilled in the art. For example, other types of signaling and supervisory techniques may be used and provision may be made for absorbing more than one digit in the trunk circuit if conditions warrant. It is not desired, therefore, that the invention be limited to the embodiment shown and described, and it is intended to cover in the appended claims all such modifications as fall within the true spirit and scope of the invention.

What is claimed is:

1. In a telephone system, the combination comprising a signal source for producing directive signals, a first signal responsive circuit, means for electrically seizing said signal responsive circuit and coupling said signal source thereto in response to a first-occurring predetermined number of particular directive signals from said suorce, a signal responsive call extending circuit, means coupled to said first circuit for initiating a coupling between said call extending circuit and said first circuit in response to the seizure of said first circuit, means included in said first circuit for absorbing a second-occurring predetermined number of directive signals from said source which follow said first-occurring predetermined number of directive signals, and other means included in said first circuit for forwarding to said call extending circuit a third-occurring number of directive signals from said source which follow said second-occurring predetermined number of directive signals only in response to the completion of the coupling between said call extending circuit and said first circuit prior to the occurrence of any of said third-occurring number of directive signals.

2. In a telephone system, a source of signals, a signal responsive circuit, means for transmitting signals from said source to said signal responsive circuit, a call extending circuit, means coupled to said signal responsive circuit for initiating a coupling action between said signal responsive circuit and said call extending circuit in response to a first signal from said signal source, and means included in said signal responsive circuit for responding to a second signal from said source to permit signals subsequent to said second signal from said source to be transmitted to said call extending circuit only when said coupling action is completed before said subsequent signals are transmitted to said signal responsive circuit.

3. The combination as set forth in claim 2 wherein said signal responsive circuit includes means for translating the form of said signals from said source before they are transmitted to said call extending circuit.

4. The combination as set forth in claim 2 and including a tone signal source for returning an indicating tone signal from said signal responsive circuit to said signal source when said coupling action is not completed before said subsequent signals are transmitted to said signal responsive circuit.

5. In a telephone system, a signal responsive incoming trunk circuit having a line circuit associated therewith, a signal responsive switching circuit, means for coupling said switching circuit with said line circuit, a signal source, means for transmitting signals from said source to said trunk circuit, means included in said trunk circuit and responsive to the receipt of a first signal from said source for activating said coupling means, and means for said trunk circuit to transmit signals as received subsequent to a second signal from said source to said switching circuit only when said switching circuit has been coupled to said line circuit before said subsequent signals are transmitted to said trunk circuit.

6. The combination set forth in claim 5 and including a tone generating circuit, and means for coupling said trunk circuit to said tone generating circuit when said switching circuit has not been coupled to said line circuit before said subsequent signals are transmitted to said trunk circuit.

7. In a telephone system, a signal responsive circuit, a call extending circuit, a first relay and a signal responsive relay in said signal responsive circuit, coupling means for coupling said signal responsive circuit and said call extending circuit, means responsive to a first operation of said signal responsive relay for activating said first relay, means responsive to the activation of said first relay for activating said coupling means, means responsive to a first release and reoperation of said signal responsive relay for altering the holding circuit of said first relay, means responsive to a second release and reoperation of said signal responsive relay for releasing said first relay when said coupling means has not coupled said signal responsive circuit and said call extending circuit, and means responsive to the second release and reoperation of said signal responsive relay for transmitting subsequent signals to said call extending circuit when said coupling means has coupled said signal responsive circuit and said call extending circuit.

References Cited by the Examiner

UNITED STATES PATENTS

| | | | |
|---|---|---|---|
| 2,409,164 | 10/46 | Taylor et al. | 179—18 |
| 2,554,115 | 5/51 | Molnar | 179—18 |
| 2,609,456 | 9/52 | Hall | 179—18 |
| 2,680,781 | 6/54 | Avery | 179—18 |
| 2,715,158 | 8/55 | Hall | 179—18 |
| 2,916,555 | 12/59 | Gatzert | 179—27 |
| 2,921,987 | 1/60 | Pedrick | 179—27 |

ROBERT H. ROSE, *Primary Examiner.*

WILLIAM C. COOPER, *Examiner.*